(12) United States Patent
Parker et al.

(10) Patent No.: US 12,086,618 B2
(45) Date of Patent: Sep. 10, 2024

(54) SERVICE VIRTUALIZATION PLATFORM

(71) Applicant: State Farm Mutual Automobile Insurance Company, Bloomington, IL (US)

(72) Inventors: Christopher John Parker, Champaign, IL (US); Adrian JC Bolt, Hudson, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 448 days.

(21) Appl. No.: 17/465,575

(22) Filed: Sep. 2, 2021

(65) Prior Publication Data

US 2023/0067891 A1 Mar. 2, 2023

(51) Int. Cl.
*G06F 9/455* (2018.01)
(52) U.S. Cl.
CPC .................................. *G06F 9/455* (2013.01)
(58) Field of Classification Search
None
See application file for complete search history.

(56) References Cited

U.S. PATENT DOCUMENTS

| | | | |
|---|---|---|---|
| 8,387,130 B2 | 2/2013 | Love et al. | |
| 8,661,132 B2 | 2/2014 | Porai et al. | |
| 8,886,571 B2 | 11/2014 | Mannava et al. | |
| 8,978,041 B2 | 3/2015 | Allen et al. | |
| 9,378,041 B2 | 6/2016 | Raskar et al. | |
| 9,471,283 B2 | 10/2016 | Esfahany et al. | |
| 10,339,039 B2 | 7/2019 | Raheja et al. | |
| 10,424,222 B2 | 9/2019 | Shokite | |
| 10,445,223 B1 | 10/2019 | Tkac et al. | |
| 10,459,753 B2 | 10/2019 | Raskar | |
| 10,523,778 B1 | 12/2019 | Lee et al. | |
| 10,819,589 B2 | 10/2020 | Raskar | |
| 2016/0026558 A1* | 1/2016 | Krishnan | G06F 9/455 |
| | | | 717/124 |
| 2016/0191415 A1* | 6/2016 | Reddy | H04L 41/0893 |
| | | | 709/226 |
| 2018/0278675 A1* | 9/2018 | Thayer | H04L 41/0806 |
| 2020/0394122 A1* | 12/2020 | Burde | G06F 11/3636 |

* cited by examiner

*Primary Examiner* — Frank D Mills
(74) *Attorney, Agent, or Firm* — Lee & Hayes, P.C.

(57) ABSTRACT

A service virtualization platform can associate different virtual service rules with different team identifiers. Software applications can be configured to submit service requests to the service virtualization platform that identify corresponding team identifiers. The service virtualization platform can respond to a service request based on a virtual service rule that is associated with a team identifier indicated in the service request, and thereby avoid responding with data defined by a different virtual service rule associated with a different team identifier. The service virtualization platform can accordingly avoid conflicts between teams that configure software applications to interact with the same type of virtual service.

20 Claims, 5 Drawing Sheets

SERVICE VIRTUALIZATION PLATFORM

TECHNICAL FIELD

The present disclosure relates to service virtualization, particularly with respect to a service virtualization platform that is configured to implement virtual services based on team-specific configurations.

BACKGROUND

Software applications are often configured to make Application Programming Interface (API) calls, or to submit other types of requests, to web services or other types of services. Service virtualization can allow a software application to interface with a virtual service, instead of a real service, during software testing and other situations.

For example, a weather application for a smartphone, or other computing device, can be designed to make an API call to a web service that returns weather information for a specified location. If a software developer wants to verify that the weather application correctly displays user interface (UI) elements associated with a tornado warning in response to retrieved weather data, it may be impractical to wait until a real tornado occurs so that the weather application can retrieve real tornado warning information from the real weather service and attempt to display the corresponding tornado warning UI elements. The software developer can instead configure a virtual weather service to return user-defined tornado warning information in response to an API call. Accordingly, the developer can cause the weather application to call the virtual weather service, instead of the real weather service, in order to retrieve the user-defined tornado warning information. The developer can thereby determine if the weather application correctly displays tornado warning UI elements in response to tornado warning information received from the virtual weather service, and thus would also display the tornado warning UI elements if similar tornado warning information is ever received from the real weather service.

Virtual services can also be used in other situations. For example, a software application can be configured to retrieve sample data from a virtual service for training purposes, to avoid retrieving real data from a real service that may not be suitable for a training scenario. As another example, if a first application component is being developed to integrate with a second application component, but the second application component has not yet been developed, the first application component can be configured during development to interact with a virtual service that emulates the planned second application component. As yet another example, software developers may not want to access real vendor services, such as credit card tokenization, via a real service during high volume testing scenarios or other software testing situations. Software developers can accordingly configure their software applications to call virtual services during testing, instead of real vendor services.

In some situations, different teams of developers working on the same software application, or different software applications, may want their application components to interact with the same virtual service, or the same type of virtual service. For example, different teams of software developers working for the same company on the same product, or related products, may want to use the same virtual service to test their application components.

However, in many existing service virtualization systems, different teams may encounter conflicts when using the same virtual service. For example, a first team may configure a virtual service to return a particular value in response to a particular input, but a second team may then, without the first team's knowledge, reconfigure the virtual service to return a different value in response to that particular input. For instance, in the virtual weather service example discussed above, the first team may configure the virtual weather service to return a temperature value of "77° F." for a particular test zip code, so that the first team can test that an application correctly displays graphics associated with warm weather. However, a second team may configure the same virtual weather service to return a different value of "25° F." in response to the same test zip code, so that the second team can test that an application correctly displays graphics associated with cold weather. In this situation, the second team's configuration of the virtual weather service can impact the first team's tests, as the first team may be unaware of the change by the second team and begin getting back the "25° F." value for the test zip code instead of the "77° F." value the first team expected. If the first team reconfigures the virtual weather service to again return the "77° F." value in response to the test zip code, that change can impact the second team's tests.

Accordingly, many existing service virtualization systems do not allow different teams to configure virtual services to return different values in response to the same inputs. This can cause conflicts when teams use the same virtual service or same type of virtual service, thereby complicating testing and development as well as prolonging testing and development times.

The example systems and methods described herein may be directed toward mitigating or overcoming one or more of the deficiencies described above.

SUMMARY

Described herein are systems and methods by which a service virtualization platform can associate different teams with different virtual service rules for virtual services. By associating different teams with different virtual service rules, users on different teams can cause software applications to invoke different virtual service rules for the same type of virtual service. Accordingly, even if different teams create virtual service rules for the same type virtual service that are applicable to the same input data in service requests, the service virtualization platform can respond to service requests associated with different teams based on distinct virtual service rules defined by those teams. The service virtualization platform described herein can accordingly avoid conflicts between different teams that use the same input data with the same virtual service or same type of virtual service, and configure virtual services to respond differently to service requests associated with different teams based on the same input data.

According to a first aspect, a computer-implemented method can include receiving, by one or more processors associated with a virtual service proxy engine, a service request from a client application. The service request can be associated with a team identifier and at least one input parameter. The method can also include identifying, by the one or more processors, a virtual service rule that is associated with the team identifier and match criteria that corresponds with the at least one input parameter. The method can also include determining, by the one or more processors, a team response indicated by the virtual service rule. The method can also include generating, by the one or more processors, a service response based on the team response.

The method can additionally include sending, by the one or more processors, the service response in response to the service request.

According to a second aspect, a service virtualization platform can include a virtual service database and a virtual service proxy engine. The virtual service database can be configured to store team configurations comprising virtual service rules associated with team identifiers. Individual virtual service rules can be associated with match criteria and team responses. The virtual service proxy engine can be configured to receive service requests that indicate the team identifiers and input parameters. The virtual service proxy engine can also be configured to identify, based on the service requests, corresponding virtual service rules in the virtual service database that are associated with the team identifiers indicated by the service requests and match criteria corresponding with the input parameters of the service requests. The virtual service proxy engine can also be configured to generate, based on the team responses of the corresponding virtual service rules, service responses to the service requests. The virtual service proxy engine can further be configured to send the service responses, in response to the service requests.

According to a third aspect, one or more non-transitory computer-readable media can store computer-executable instructions associated with a virtual service proxy engine that, when executed by one or more processors, cause the one or more processors to perform operations. The operations can include receiving a service request associated with a team identifier and at least one input parameter, and identifying a set of one or more virtual service rules associated with the team identifier. The operations can also include identifying, among the set of one or more virtual service rules, a particular virtual service rule associated with match criteria that corresponds with the at least one input parameter. The operations can further include determining a team response indicated by the particular virtual service rule, and sending, in response to the service request, a service response based on the team response.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
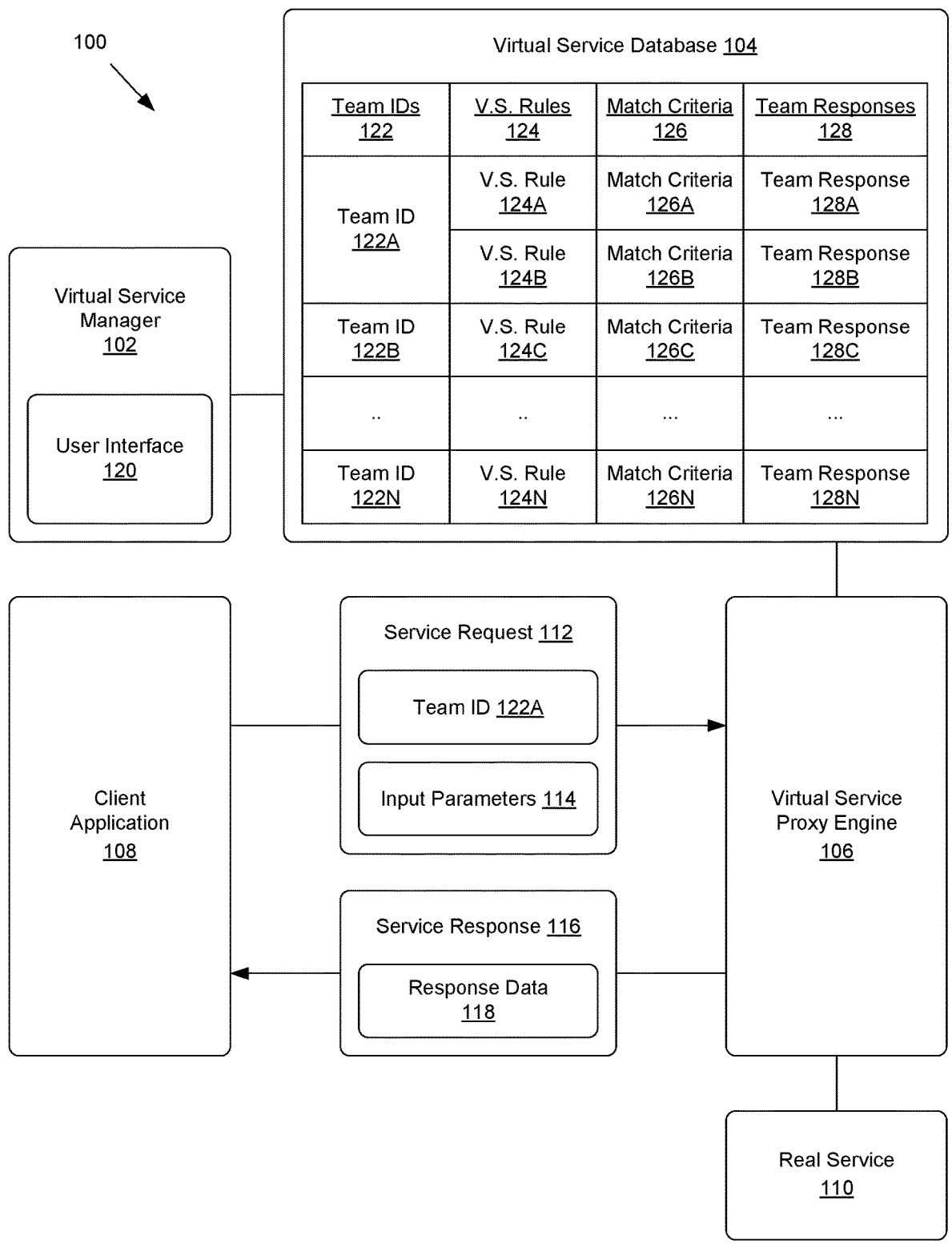
FIG. 1 shows an example of a service virtualization platform.

FIG. 1 shows an example 100 of a service virtualization platform. The service virtualization platform can include a virtual service manager 102, a virtual service database 104, and a virtual service proxy engine 106. The virtual service proxy engine 106 can be configured, based on information that has been provided by users via the virtual service manager 102 and that is stored in the virtual service database 104, to implement at least one virtual service. A virtual service, implemented via the virtual service proxy engine 106, can be accessed by one or more client applications, such as client application 108 shown in FIG. 1, in place of a real service 110.

A client application, such as the client application 108, can be a software application, script, or other executable element that can be executed by one or more processors of a computing device based on computer-executable instructions. A client application may be a local application that can be installed and/or executed locally on a computing device, a web application that can be executed on a remote server or in a cloud computing environment, an element of a larger application or system that interacts with other elements of the larger application or system, and/or any other type of executable software.

Client applications, such as the client application 108, can be developed to interact with one or more real services, such as the real service 110 shown in FIG. 1. A real service may be a web service, another software application, or any other component that may provide data to a client application. For example, the real service 110 can be a web service that can return data to the client application 108 in response to a request sent by the client application 108 to the real service 110 over the Internet. In some examples, the real service 110 can be based on Representational State Transfer (REST) principles, and thus be considered a RESTful service.

However, although client applications can be developed to interact with real services, client applications can be configured to interact with virtual services in place of the real services in some situations. For example, to test a feature of the client application 108, a software developer may configure source code of the client application 108 to request data from a virtual service instead of the real service 110, to avoid fetching real data from the real service 110 that may not be suitable for testing of the feature of the client application 108. In some examples, an element of a client application can be configured to, during testing situations or other defined conditions or scenarios, detect and/or intercept requests that other elements of the client application would otherwise transmit to a real service, and redirect those requests to the virtual service proxy engine 106 as described herein.

To interact with a virtual service, a client application can transmit a service request 112 to the virtual service proxy engine 106. In some examples, the client application can be configured to directly send the service request 112 to the virtual service proxy engine 106. In other examples, an element of the client application can be configured to intercept a request that would otherwise be sent by another element of the client application to a real service, and redirect the intercepted request to the virtual service proxy engine 106 as the service request 112. The service request 112 can be a RESTful request, or other type of request. For example, the service request 112 can be a Hypertext Transfer Protocol (HTTP) request associated with an HTTP method, such as GET, POST, DELETE, PUT, or another HTTP method. In other examples, the service request 112 can be a Simple Object Access Protocol (SOAP) Message, or other type of message.

The service request 112 can indicate input parameters 114. The input parameters 114 can identify a requested virtual service, a requested operation of the virtual service, input data associated with the requested operation of the virtual service, a test environment or endpoint associated with the virtual service or service request 112, and/or other data associated with the service request 112. As discussed further below, a virtual service implemented via the service virtualization platform can be associated with one or more types of operations, and can be configured to return data according to one or more operations based on the input parameters 114 and other data indicated by the service request 112.

As a non-limiting example, a virtual weather service may provide a first operation that can provide a temperature associated with an input zip code, a second operation that can provide a humidity level associated with an input zip code, a third operation that can provide a precipitation amount associated with an input zip code, and/or other operations. In this example, the input parameters 114 of the service request 112 may identify the virtual weather service, indicate a zip code of a location for which weather information is being requested, and include an identifier of a requested operation to be performed by the virtual weather service in association with the provided zip code.

In some examples, the service request 112 may indicate input parameters 114 using a Uniform Resource Locator (URL), another Uniform Resource Indicator (URI) or identifier, an API associated with the virtual service or virtual service operation, header values indicated by the service request 112, body data of the service request 112, metadata indicated by the service request 112, and/or any other data associated with the service request 112. For example, the service request 112 may indicate one or more types of input parameters 114, such as an identifier of a requested virtual service, an identifier of a requested operation of the virtual service, an identifier of a test environment or endpoint, and/or input data to be processed by the virtual service according to the requested operation. Such input parameters 114 may be indicated by one or more portions of a URL to which the service request 112 is addressed, by header values of the service request 112, in the body of the service request 112, and/or by other data associated with service request 112.

The virtual service proxy engine 106 can respond to the service request 112 sent by the client application 108 by returning a service response 116 to the client application 108. The service response 116 can include response data 118 returned by the virtual service proxy engine 106. As discussed further below, the response data 118 in the service response 116 can be determined by the virtual service proxy engine 106 based on a virtual service rule, stored in the virtual service database 104, that corresponds with the input parameters 114 of the service request 112. In some examples, the service response 116 can also include a header value or other data indicating that the service response 116 was sent by the virtual service proxy engine 106 instead of a real service. However, in other examples, the service response 116 can omit an indication that it was sent by the virtual service proxy engine 106, and the service response 116 can thus be similar to a real response that a real service would have returned to the client application 108.

The service virtualization platform can be configured to implement virtual services used by one or more software applications, such as the client application 108, that are associated with different teams of software developers, software testers, and/or other types of users. Each team can be associated with one or more users, and individual users can be associated with one or more teams. In some examples, different teams may be associated with the same company, or other entity. For example, a company may have a relatively large number of software developers. The company may distribute the software developers among different teams that are responsible for developing different software applications, and/or different components of the same software application.

Figure 2:
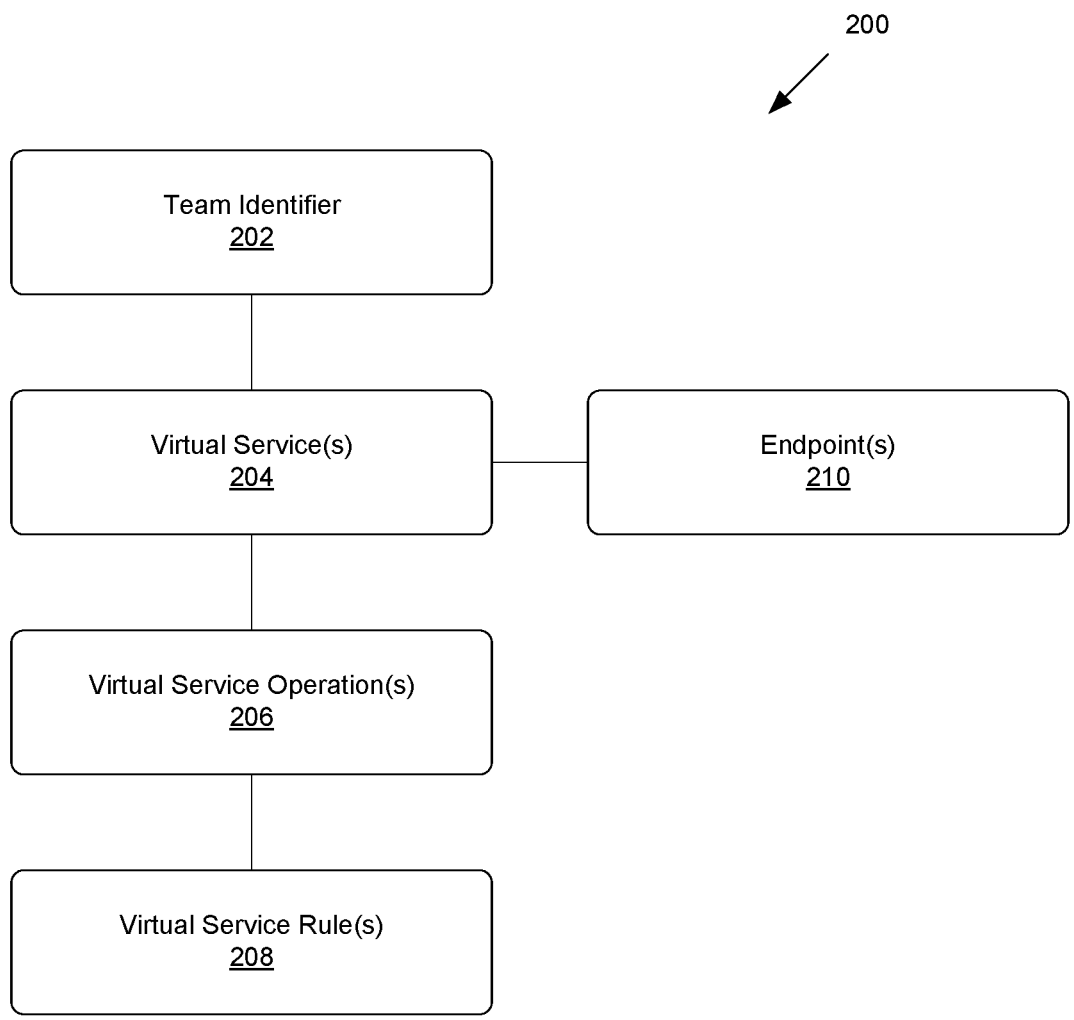
FIG. 2 shows an example of a team configuration associated with a particular team.

Different teams may want their software to interact with the same type of virtual service. For example, two teams may be developing different software elements of the client application 108, or software elements of different client applications, that are intended to interact with the real service 110. The two teams may want to test their software elements based on data retrieved from a virtual service rather than the real service 110. Users on different teams can accordingly use a user interface 120 of the virtual service manager 102 to generate and/or edit corresponding team configurations, associated with virtual services, in the virtual service database 104. A team configuration associated with a team can include data associated with the team, including team-defined virtual service rules for one or more virtual services. An example team configuration for a particular team is shown in FIG. 2, and is described further below with respect to that figure. The team configurations in the virtual service database 104 can cause the virtual service proxy engine 106 to respond to service requests associated with the different teams differently, even if the service requests associated with the different teams indicate the same type of virtual service, the same virtual service operation, and/or the same input parameters.

The virtual service manager 102 can be a server, website, application, or other computing element or platform that can host, display, and/or execute the user interface 120. The virtual service manager 102 can retrieve data from the virtual service database 104, and cause the user interface 120 to display the retrieved data. The virtual service manager 102 can also receive user input via the user interface 120, and use the received user input to interact with the virtual service database 104. For example, based on received user input, the virtual service manager 102 can store new team configurations in the virtual service database 104, edit existing team configurations in the virtual service database 104, or otherwise access, create, and/or edit data in the virtual service database 104.

The team configurations stored in the virtual service database 104 can be associated with team identifiers 122. The team identifiers 122 can be identifiers that are uniquely associated with specific teams. The virtual service database 104 can include team configurations associated with any number of team identifiers 122, such as team identifier 122A, team identifier 122B, . . . and team identifier 122N, as shown in FIG. 1. In some examples, the team identifiers 122 can be port numbers of ports exposed by the virtual service proxy engine 106 for different teams. In other examples, the team identifiers 122 can be numbers, names, alphanumeric values, and/or other values associated with different teams. For example, a team identifier can be a string of one or more alphanumeric characters.

Team identifiers 122 can also be indicated by service requests, such as the service request 112 shown in FIG. 1, that are submitted to the virtual service proxy engine 106. Accordingly, service requests that are associated with different teams can indicate different team identifiers 122. For example, if the team identifiers 122 are port numbers that the virtual service proxy engine 106 associates with different teams, each team can configure its software to address service requests to the virtual service proxy engine 106 based in part on the team's port number, or to otherwise include data that indicates the team's port number. As another example, if the team identifiers 122 are unique names, numbers, or other identifiers associated with different teams, each team can configure its software to encode the team's identifier in header values of service requests, in URLs associated with the service requests, in body data of the service requests, and/or in other data associated with the service requests.

For example, if a first team is developing the client application 108 shown in FIG. 1, and the first team is associated with team identifier 122A, the first team can configure the client application 108 to indicate the team identifier 122A in data associated with the service request 112 submitted to the virtual service proxy engine 106. Similarly, a second team, associated with team identifier 122B, can configure its software to indicate the team identifier 122B in data associated with another service request submitted to the virtual service proxy engine 106.

In some examples, service requests associated with different teams may indicate the same input parameters 114. However, such service requests can indicate different team identifiers 122 associated with the different teams. Accordingly, as discussed further below, the virtual service proxy engine 106 can respond differently to service requests that indicate the same input parameters 114, based on different team configurations associated with the different team identifiers 122 indicated by the service requests.

As a non-limiting example, the service request 112 can be an HTTP GET request addressed to a URL such as "http://www.example.com/weather/gettemp?zip=61710" or "http://www.example.com/weather/gettemp/zip/61710." In this example, the host and/or one or more portions of the path of the URL can indicate a requested virtual service and a requested operation of the virtual service, such as a "get temperature" operation of a virtual weather service. In this example, a query string of the URL ("zip=61710") or portions of the URL path ("zip/61710") can indicate an input parameter of the service request 112, to be processed based on the requested operation of the virtual service. Additionally, in this example, the team identifier associated with the service request 112 can be indicated by a header value of the service request 112. In some situations, different teams may configure their software elements to send service requests to the same URL and use the same query string or path to provide the same input parameters 114. For example, multiple teams may configure their software to send service requests to "http://www.example.com/weather/gettemp?zip=61710," but configure header values of the service requests to indicate different team identifiers 122 such that the virtual service proxy engine 106 can determine which team is associated with each service request.

Alternatively, in some examples, a query string, URL path, or other URL data can directly indicate a team identifier. For instance, a service request associated with a first team may be addressed to "http://www.example.com/weather/gettemp?id=1&zip=61710," such that both a team identifier ("id=4") and an input zip code parameter ("zip=61710") are identified in the query string of the URL. A similar service request associated with a second team may be addressed to "http://www.example.com/weather/gettemp?id=2&zip=61710," such that a different team identifier ("id=2") associated with the second team is indicated in the query string of the URL. In this example, although the input zip code parameters provided in the URLs are the same for both service requests, the URLs of the service requests can indicate different team identifiers such that the virtual service proxy engine 106 can determine which team is associated with each service request.

In other examples, a service request can be an HTTP POST request, a SOAP request, or any other type of request. For instance, the service request 112 can be a POST request addressed to "http://www.example.com/weather/gettemp," and can include a particular team identifier value and one or more input parameters 114 in a body of the POST request, and/or in other data provided with the POST request. If the service request 112 is a SOAP request, a team identifier value and/or one or more input parameters 114 can be provided in Extensible Markup Language (XML) data or other data associated with the SOAP request.

In some examples, one or more portions of a URL to which a service request is addressed can also indicate a particular test environment or endpoint. As described further below, teams can map virtual services to one or more test environments and/or other types of endpoints, which may be associated with different URL domain names, subdomains, hostnames, path components, or other URL elements. As a non-limiting example, the virtual service proxy engine 106 may map a particular virtual service to a first test environment associated with "http://weather-env1.test.example.com/weather," and/or to a second test environment associated with "http://weather-env2.test.example.com/weather." As another non-limiting example, the virtual service proxy engine 106 may map a virtual service to one or more endpoints that correspond to different test environments, training environments, and/or other types of environments or uses.

The virtual service database 104 can store data associated with any number of virtual service rules 124, such as virtual service rule 124A, virtual service rule 124B, . . . and virtual service rule 124N, as shown in FIG. 1. The virtual service rules 124 can be defined by members of teams, via the user interface 120 of the virtual service manager 102. The virtual service rules 124 can accordingly be associated with the teams that defined them. The virtual service rules 124 can also be associated with particular virtual services, particular operations of virtual services, and/or particular test environments or endpoints, as discussed in more detail below.

The virtual service rules 124 can be associated, in the virtual service database 104 with corresponding team identifiers 122 of the teams that defined the virtual service rules 124. For example, a first team can define virtual service rule 124A and virtual service rule 124B, and accordingly virtual service rule 124A and virtual service rule 124B can be associated with a first team identifier 122A of the first team in the virtual service database 104 as shown in FIG. 1. Similarly, a second team can define virtual service rule 124C, and virtual service rule 124C can accordingly be associated with a second team identifier 122B of the second team in the virtual service database 104. Individual team identifiers 122 can be associated with any number of virtual service rules 124 for any number of virtual services.

An individual virtual service rule can be associated with a particular virtual service and/or a particular virtual service operation. For example, a particular team may define a set of virtual service rules 124 for a particular virtual service, including virtual service rules 124 that are specifically associated with particular operations of that virtual service. A particular team can also define different sets of virtual service rules for different virtual services, such that the team can set up and manage multiple virtual services.

The virtual service proxy engine 106 can be associated with a domain name, such that service requests can be addressed to a URI, associated with that domain name. Different virtual services and/or different virtual service operations, and thus the virtual service rules 124 associated with those virtual services and/or virtual service operations, can also be associated with different URL paths in the virtual service database 104. As a non-limiting example, if the virtual service proxy engine 106 is associated with a domain name of "www.example.com," a first set of one or more virtual service rules 124 may be associated with a first URL path (such as "www.example.com/weather/temperature") and a second set of one or more virtual service rules 124 may be associated with a second URL path (such as "www.example.com/weather/precipitation").

In some examples, the virtual service proxy engine 106 can be associated with one or more test environments and/or other types of endpoints indicated by domain names, subdomains, hostnames, path components, and/or other URL components. As described further below, teams can map individual virtual services, and thus the virtual service rules 124 associated with those virtual services, to particular test environments and/or other types of endpoints. As a non-limiting example, a team may use the user interface 120 to map a virtual weather service, and the virtual service rules 124 associated with the virtual weather service, to a first test environment associated with "http://weather-env1.test.example.com/weather." The virtual service proxy engine 106 can be configured to accept service requests addressed to "http://weather-env1.test.example.com/weather," and can respond to the service requests based on corresponding virtual service rules 124 as discussed further below.

In some examples, a team can use the user interface 120 to re-map existing virtual services, and existing virtual service rules 124, to different test environments and/or other types of endpoints. For example, a user on a team can use the user interface 120 to re-map the existing virtual weather service, and the existing virtual service rules 124 associated with the virtual weather service, to a second test environment associated with "http://weather-env2.test.example.com/weather," The virtual service proxy engine 106 can also be configured to accept service requests addressed to "http://weather-env2.test.example.com/weather," and can respond to the service requests based on corresponding virtual service rules 124 as discussed further below. Accordingly, users can change the test environment or endpoint associated with virtual service rules 124 as desired, without changing the virtual service rules 124 themselves, for instance for use during different testing situations, training situations, or other situations. In other examples, a team can use the user interface 120 to map virtual services, and corresponding virtual service rules 124, to multiple test environments and/or other types of endpoints simultaneously.

The virtual service rules 124 defined in the virtual service database 104 can indicate match criteria 126 and team responses 128. Each individual virtual service rule can define specific match criteria, and a particular team response to be returned by the virtual service proxy engine 106 if that match criteria is met by a service request that indicates the team identifier associated with the virtual service rule. For example, virtual service rule 124A can be associated with match criteria 126A and team response 128A, virtual service rule 124B can be associated with match criteria 126B and team response 128B, and virtual service rule 124C can be associated with match criteria 126C and team response 128C.

The match criteria 126 of a virtual service rule can indicate information associated with situations in which the virtual service rule is to be applied by the virtual service proxy engine 106. For example, the match criteria 126 of a virtual service rule may indicate a virtual service associated with the virtual service rule, an operation of the virtual service that is associated with the virtual service rule, and/or other input parameters 114 that are associated with the virtual service rule.

In some examples, the match criteria 126 of a virtual service rule can be expressed as one or more name-value pairs. For instance, the match criteria 126 of a virtual service rule can indicate names of one or more attributes, as well as values for the attributes that would satisfy the match criteria 126. As a non-limiting example, the match criteria 126 of a particular virtual service rule can identify a particular name of an attribute, such as "zip," and a particular value for the attribute, such as "61710." Accordingly, in this example, the particular virtual service rule may apply to a service request if input parameters 114 of the service request indicate a zip code of "61710."

However, in other examples, the match criteria 126 of a virtual service rule can be dynamic, for instance by indicating variables, wildcards, conditional statements, mathematical operations, and/or other dynamic elements. As a non-limiting example, the match criteria 126 of a virtual service rule can indicate that the virtual service rule should be applied to a service request if the input parameters 114 of the service request include a specific location value of "California," and also include any age value that is less than 50 years old. In this example, the virtual service proxy engine 106 can determine that the virtual service rule applies to a service request that includes a location value of "California" and an age value of "48," but may determine that the virtual service rule does not apply to another service request that includes a location value of "California" and an age value of "53." As another non-limiting example, the match criteria 126 of a virtual service rule can indicate that the virtual service rule should be applied to a service request if the input parameters 114 of the service request include a name value that starts with "Jo." Accordingly, in this example, the virtual service proxy engine 106 can determine that the virtual service rule applies to service requests that indicate name values of "John," "Joe," "JoAnne," or any other name that starts with "Jo."

The team response of a virtual service rule can indicate team-defined information to be used, by the virtual service proxy engine 106, as the response data 118 of the service response 116 if the service request 112 indicates the team identifier associated with the virtual service rule and also includes input parameters 114 that correspond to the match criteria 126 of the virtual service rule. In some examples, the team response of a virtual service rule can indicate one or more specific team-defined values to be returned as the response data 118. In other examples, the team response of a virtual service rule can indicate team-defined instructions for dynamically generating response data 118. Accordingly, a team response associated with a virtual service rule can instruct the virtual service proxy engine 106 to dynamically generate the response data 118 based on a current date, a relative date, random numbers, other random values, one or more input parameters 114 provided in the service request 112 itself, predefined values, data retrieved from other databases or sources, and/or any other data.

The virtual service proxy engine 106 can accordingly be configured to respond to service requests based on virtual service rules 124 stored in the virtual service database 104. For example, the virtual service proxy engine 106 can receive the service request 112, and can determine that the team identifier and input parameters 114 of the service request 112 correspond with a particular virtual service rule in the virtual service database 104. The virtual service proxy engine 106 can accordingly generate the service response 116 based on the team response associated with the particular virtual service rule, and can send the service response 116 to the client application 108.

For instance, the service request 112 from the client application 108 can indicate the team identifier 122A of a first team that, in the example discussed above, defined virtual service rule 124A and virtual service rule 124B. Based on the team identifier 122A in the service request 112, the virtual service proxy engine 106 can determine that any of the virtual service rules 124 associated with the team identifier 122A, including virtual service rule 124A and virtual service rule 124B, may potentially be applicable to the service request 112. The service request 112 can include one or more input parameters 114, as discussed above. The virtual service proxy engine 106 can determine if the input parameters 114 correspond to the match criteria 126 of any of the virtual service rules 124 associated with the team identifier 122A. If the input parameters 114 of the service request 112 do correspond with the match criteria 126 of a particular virtual service rule, the virtual service proxy engine 106 can identify the team response associated with that particular virtual service rule. The virtual service proxy engine 106 can accordingly generate and return the service response 116 to the client application 108 based on the team response indicated by the particular virtual service rule. For example, the service response 116 can include response data 118 that matches, or is dynamically generated based on, the team response of the particular virtual service rule.

By way of a non-limiting example, virtual service rule 124A and virtual service rule 124B can both be associated with team identifier 122A, and can both be associated with a virtual weather service. Virtual service rule 124A and virtual service rule 124B can both be associated with a "get temperature" operation of the virtual weather service that returns a temperature value in response to an input zip code. In this example, virtual service rule 124A may have match criteria 126A associated with an input zip code of "61710," and have team response 128A indicating that a value of "77° F." is to be returned if the input parameters 114 of the service request 112 include the "61710" zip code indicated in the match criteria 126A. Virtual service rule 124B may be associated with the same "get temperature" operation, but have match criteria 126B associated with an input zip code of "98101," and have team response 128B indicating that a value of "18° C." is to be returned if the input parameters 114 include the "98101" zip code indicated in the match criteria 126B.

In this example, the virtual service proxy engine 106 can receive the service request 112 indicating team identifier 122A. The virtual service proxy engine 106 can determine, based on the virtual service database 104, that virtual service rule 124A and virtual service rule 124B are associated with team identifier 122A, and thus that virtual service rule 124A and virtual service rule 124B are candidate rules for responding to the service request 112. The virtual service proxy engine 106 can also determine that the input parameters 114 indicate a request, to the virtual weather service, for the temperature associated with zip code "98101." The virtual service proxy engine 106 can thus determine that the input parameters 114 correspond to the match criteria 126B of virtual service rule 124B, instead of the match criteria 126A of virtual service rule 124A. Accordingly, the virtual service proxy engine 106 can generate the service response 116 with response data 118 that includes the "18° C." value, indicated by the team response 128B of virtual service rule 124B, and return the service response 116 to the client application 108.

Some virtual service rules 124 associated with the same team identifier may be associated with different operations of the same virtual service. For example, some virtual service rules 124 associated with a virtual weather service can be associated with a "get temperature" operation, and can define different temperature values to return for different zip codes. However, other virtual service rules 124 associated with the same virtual weather service can be associated with a "get humidity" operation, and can define different humidity level values to return for different zip codes. Accordingly, a service request that identifies team identifier 122A and requests the "get temperature" operation for an input zip code of "61710" may correspond with the match criteria 126A of virtual service rule 124A, and thereby cause the virtual service proxy engine 106 to return a service response indicating a temperature of "77° F." based on the team response 128A of virtual service rule 124A. However, another service request that also identifies team identifier 122A may request the "get humidity" operation for the same input zip code of "61710," and may correspond with match criteria 126 of a different virtual service rule associated with team identifier 122A that has a team response indicating a response value of "65%." The virtual service proxy engine 106 can accordingly return a service response indicating a humidity level of "65%" based on the team response of the corresponding virtual service rule.

Additionally, multiple virtual service rules 124 associated with the same team identifier can be associated with the same virtual service and the same virtual service operation, such that more than one of the virtual service rules 124 may potentially be applicable to a particular service request. For instance, the input parameters 114 of the service request 112 may satisfy match criteria 126 of more than one virtual service rule associated with the team identifier indicated by the service request 112. However, a team can define a priority order of such virtual service rules 124 in the virtual service database 104, such that the virtual service proxy engine 106 can apply the highest-priority virtual service rule that is associated with match criteria 126 satisfied by the input parameters 114 of the service request 112. In some examples, a priority order can indicate relative priorities associated with virtual service rules 124 that have match criteria 126 associated with the same types of input parameter values. For example, a priority order can indicate a relative priority of multiple virtual service rules 124 that have match criteria 126 associated with zip code values. In other examples, a priority order can indicate relative priorities associated with virtual service rules 124 that have match criteria 126 associated with the same types of input parameter values and/or different types of input parameter values.

As a non-limiting example, a team may define four virtual service rules 124 that are associated with the same operation of a virtual service. The team can also define a priority order of the four virtual service rules 124 in the virtual service database 104. In this example, the four virtual service rules 124 can include, in order from highest-priority to lowest-priority, a first virtual service rule with first match criteria satisfied by an insurance policy number value of "12345," a second virtual service rule with second match criteria satisfied by year value of "2021," a third virtual service rule with third match criteria satisfied by a state value of "Illinois," and a fourth virtual service rule with fourth match criteria satisfied by an insurance policy number value of "1234*" (where "*" designates a wildcard that can be satisfied by any value).

In this example, if the input parameters 114 of the service request 112 indicate an insurance policy number of "12345," a year of "2021," and a state of "Illinois," the input parameters 114 would satisfy the match criteria 126 of all four virtual service rules 124. However, because the first virtual service rule (with first match criteria indicating an insurance policy number value of "12345") has the highest priority, the virtual service proxy engine 106 can respond to the service request 112 based on a team response defined by the first virtual service rule, instead of responding to the service request 112 based on any of the other three virtual service rules that otherwise would correspond to the service request 112. If the input parameters 114 of the service request 112 instead indicated an insurance policy number of "17347," a year of "2020," and a state of "Illinois," the virtual service proxy engine 106 can determine that the third virtual service rule (with third match criteria satisfied by a state value of "Illinois") is the highest-priority virtual service rule that applies to the service request 112, and can respond to the service request 112 based on a team response defined by the third virtual service rule. Similarly, if the input parameters 114 of the service request 112 instead indicated an insurance policy number of "12347," a year of "2020," and a state of "Missouri," the virtual service proxy engine 106 can determine that the fourth virtual service rule (with fourth match criteria satisfied by any insurance policy value that at least begins with "1234") is the highest-priority virtual service rule that applies to the service request 112, and can respond to the service request 112 based on a team response defined by the fourth virtual service rule.

As discussed above, different teams may define virtual service rules 124 for the same type of virtual service, and/or the same type of virtual service operation. Virtual service rules 124 defined by different teams can also, in some cases, have the same match criteria 126. However, virtual service rules 124 defined by different teams with the same match criteria 126 may have different team responses 128. Accordingly, if the virtual service proxy engine 106 receives service requests that have the same input parameters 114, but are associated with different teams, the virtual service proxy engine 106 can return service responses with different response data based on different team responses 128.

By way of a non-limiting example, a first team associated with team identifier 122A may generate virtual service rule 124B as a rule for a "get temperature" operation of a virtual weather service as discussed above. A second team associated with team identifier 122B may similarly generate virtual service rule 124C as a rule for a "get temperature" operation of a virtual weather service. The first team's virtual service rule 124B can have match criteria 126B indicating an input zip code of "98101." The second team's virtual service rule 124C can have match criteria 126C that also indicates an input zip code of "98101." Accordingly, in this example, virtual service rule 124B and virtual service rule 124C both have the same match criteria 126, but are associated with different teams. However, the first team's virtual service rule 124B can have team response 128B indicating a response value of "18° C." while the second team's virtual service rule 124C can have team response 124C indicating a different response value of "45° F."

In this example, if the service request 112 includes the team identifier 122A of the first team, and the input parameters 114 indicate an input zip code of "98101," the virtual service proxy engine 106 can determine that the first team's virtual service rule 124B applies to the service request 112. The virtual service proxy engine 106 can accordingly return the service response 116 with response data 118 indicating an "18° C." temperature value, according to the team response 128B of the first team's virtual service rule 124B. However, if the service request 112 indicates the same input zip code of "98101" in the input parameters 114, but includes the team identifier 122B of the second team (instead of the team identifier 122A of the first team), the virtual service proxy engine 106 can determine that the second team's virtual service rule 124C applies to the service request 112. Accordingly, the virtual service proxy engine 106 can return the service response 116 with response data 118 that indicates a "45° F." temperature value, according to the team response 128C of the second team's virtual service rule 124C. The virtual service proxy engine 106 can therefore be configured to return service responses with different response data, based on different virtual service rules 124 in the virtual service database 104, if service requests indicate the same input parameters 114 but different team identifiers 122.

In some examples, if the virtual service proxy engine 106 receives the service request 112, but does not identify a virtual service rule in the virtual service database 104 that corresponds with the service request 112, the virtual service proxy engine 106 can forward the service request 112 to the real service 110. For example, the virtual service proxy engine 106 can attempt to identify one or more virtual service rules 124 in the virtual service database 104 that are associated with a team identifier indicated by the service request 112, and that also have match criteria 126 satisfied by input parameters 114 of the service request 112. However, if the virtual service proxy engine 106 determines that none of the virtual service rules 124 associated with the team identifier have match criteria 126 that corresponds with the input parameters 114 of the service request 112, the virtual service proxy engine 106 can forward the service request 112 to the real service 110. The virtual service proxy engine 106 can also receive a response to the service request 112 from the real service 110, and forward the response from the real service 110 to the client application 108 as the service response 116.

As a non-limiting example, the team identifier 122A can be associated with virtual service rule 124A (with match criteria 126A indicating an input zip code of "61710") and virtual service rule 124B (with match criteria 126B indicating an input zip code of "98101") in the virtual service database 104, as discussed in an example above. However, if the virtual service proxy engine 106 receives a service request from the client application 108 that indicates the team identifier 122A, but specifies an input zip code of "94108," the virtual service proxy engine 106 may determine that none of the virtual service rules 124 in the virtual service database 104 associated with team identifier 122A have match criteria 126 associated with the "94108" zip code. Accordingly, the virtual service proxy engine 106 can determine that none of the virtual service rules 124 in the virtual service database 104 apply to the service request indicating the input zip code of "94108," and can forward the service request to the real service 110. The virtual service proxy engine 106 can receive a response from the real service 110 indicating an actual temperature associated with the "94108" zip code, and can forward that response to the client application 108.

In some examples, virtual service operations of the virtual service proxy engine 106, and/or individual virtual service rules 124, can be toggled on or off in association with individual teams and/or individual test environments or endpoints. For instance, the user interface 120 of the virtual service manager 102 can provide options for virtual services and/or particular virtual service rules 124 associated with a user's team to be toggled on or off by the user. Toggling a virtual service or virtual service rule off can unmap the virtual service or virtual service rule from the virtual service proxy engine 106, effectively disabling the virtual service or virtual service rule, and causing the virtual service proxy engine 106 to act as a pass-through to real services for corresponding service requests. Similarly, toggling a virtual service or virtual service rule on can map or re-map the virtual service or virtual service rule to the virtual service proxy engine 106, effectively enabling or re-enabling the virtual service or virtual service rule, and causing the virtual service proxy engine 106 to respond to corresponding service requests based on the virtual service or virtual service rule.

For example, if the virtual service proxy engine 106 is toggled off with respect to a particular team, the virtual service proxy engine 106 can continue to operate and receive service requests that identify that particular team, but the virtual service proxy engine 106 can forward all of those service requests to real services. However, if the virtual service proxy engine 106 is toggled on with respect to a particular team, the virtual service proxy engine 106 can respond to service requests associated with the team that match the team's virtual service rules 124 in the virtual service database 104, and forward other service requests associated with the team that do not match any of the team's virtual service rules 124 in the virtual service database 104 to real services. Similarly, if the virtual service proxy engine 106 identifies a virtual service rule in the virtual service database 104 that matches a service request, but the virtual service rule has been toggled off such that the virtual service rule is currently disabled or inactive, the virtual service proxy engine 106 can forward the service request to a real service. Additionally, if a virtual service is toggled off with respect to a test environment or endpoint, the virtual service proxy engine 106 can continue to operate and receive service requests addressed to a URL associated with that test environment or endpoint, but the virtual service proxy engine 106 can forward all of those service requests to real services.

As discussed above, virtual services and/or individual virtual service rules can be associated with different endpoints. In some examples, the user interface 120 of the virtual service manager 102 can provide options for virtual services and corresponding virtual service rules 124, associated with a user's team, to be associated with a "published" endpoint and/or a "draft" endpoint. The "published" endpoint and the "draft" endpoint can be associated with different URLs. The "draft" endpoint can allow a user to try out a virtual service and its virtual service rules 124. If the user is satisfied with the virtual service and its virtual service rules 124, the user can select a "publish" option in the user interface 120 to associate a copy of the virtual service and its virtual service rules 124 with the "published" endpoint. A parallel copy of the virtual service and its virtual service rules 124 can remain associated with the "draft" endpoint. Accordingly, the user may test out and/or make changes to a draft copy of the virtual service and its virtual service rules 124 in association with the "draft" endpoint, and then publish an updated copy of the virtual service and its virtual service rules 124 to the "published" endpoint when desired.

Although examples are provided herein with respect to the client application 108 retrieving weather data from a virtual service and/or the real service 110, virtual services and/or the real service 110 can be configured to provide any type of data to the client application 108 via the virtual service proxy engine 106. For example, a virtual service and/or the real service 110 may be configured to provide response data 118 including payment data, billing data, human resource data, customer account data, order data associated with products or services, time and date data, location data, and/or any other type of data.

As discussed above, in some examples different teams may configure software to interact with the same type of virtual service. However, the service virtualization platform can avoid conflicts between the teams based on different virtual service rules 124 in the virtual service database 104 associated with the same input parameters 114 but different team identifiers 122.

As a non-limiting example, different teams working on billing and payment elements of the client application 108, or different client applications, may design the billing and payment elements to interact with the same real service 110 that is configured to return a balance due amount for a customer account. During testing, the teams can set up different virtual service rules 124 in the virtual service database 104 that are associated with the same test customer account number and the same type of virtual billing and payment service. The billing team may configure its virtual service rule to cause the virtual service to return a $100.00 balance due amount for the test customer account number. The payment team may configure its virtual service rule to cause the virtual service to return a $0.00 balance due amount for the test customer account number. Accordingly, if the billing team expects its service requests indicating the test customer account number to retrieve a $100.00 balance due amount for test purposes, the virtual service proxy engine 106 can return the $100.00 balance due amount of according to the billing team's virtual service rule. Similarly, if the payment team expects its service requests indicating the test customer account number to retrieve a $0.00 balance due amount for test purposes, the virtual service proxy engine 106 can return the $0.00 balance due amount of according to the payment team's virtual service rule. Additionally, if the payment team changes its virtual service rule to cause the virtual service to return a $25.00 balance due amount for the test customer account number, that change to the payment team's virtual service rule may not impact responses by the virtual service proxy engine 106 to service requests associated with the billing team, and the virtual service proxy engine 106 can continue return the $100.00 balance due amount in response to service requests associated with the billing team.

Accordingly, different teams, such as teams associated with the same company or entity, can use the same service virtualization platform and cause their software to interact with the same virtual service proxy engine 106, without leading to conflicts between the teams. For example, users on each team can use the user interface 120 of the virtual service manager 102 to create and/or edit virtual service rules 124 associated with the same virtual service or same type of virtual service. Because the virtual service rules 124 can be associated with different team identifiers 122, different teams can configure their virtual service rules 124 differently without causing conflicts between the teams. Moreover, because each team can use the same service virtualization platform, including the same virtual service manager 102 and the same virtual service proxy engine 106, the teams can avoid the time, effort, and extra computing resources that may be associated with creating distinct virtual service platforms for each team's virtual services. For instance, rather than separately installing different service virtualization platforms on different computing devices, and/or separately instantiating and executing distinct virtual services for each team on different hardware and/or service virtualization frameworks, different teams can use the same service virtualization platform without conflicts due to distinct virtual service rules 124 being associated with the different teams.

As discussed above, team configurations associated with different teams can be stored in the virtual service database 104, such that the virtual service proxy engine 106 can respond to service requests associated with those teams based on different team-defined virtual service rules in order to avoid conflicts between the teams. The virtual service database 104 can accordingly store data associated with multiple team configurations, such as the team configuration data for a single team shown in FIG. 2.

FIG. 2 shows a non-limiting example 200 of a team configuration associated with a particular team. The virtual service database 104 can store data associated with team configurations, such as the team configuration shown in FIG. 2, for multiple teams. As shown in FIG. 2, a team configuration associated with a particular team can be associated with a team identifier 202 that is uniquely associated with that particular team. The team identifier 202 can be a number, name, port number, or any other type of identifier, as discussed above with respect to the team identifiers 122 shown in FIG. 1.

The team configuration associated with the team can include data associated with one or more virtual services 204. As discussed above with respect to FIG. 1, virtual services can be configured to emulate or replace real services, for instance during testing of software applications. Each of the virtual services 204 can be associated with one or more virtual service operations 206. As a non-limiting example, a virtual weather service may be associated with a "get temperature" operation, a "get humidity" operation, and/or other virtual service operations. Each of the virtual service operations 206 can also be associated with one or more virtual service rules 208, such as the virtual service rules 124 discussed above with respect to FIG. 1. Each of the virtual service rules 208 can indicate match criteria and a corresponding team response to be returned if a service request corresponds with the match criteria of the virtual service rule.

In some examples, the team configuration for the team can identify a URL path associated with each of the virtual services 204 and/or the virtual service operations 206. Accordingly, each virtual service operation of each virtual service can be associated with a different URL path. Additionally, a particular URL path associated with a particular virtual service operation of a particular virtual service can correspond with a set of one or more virtual service rules 208 associated with that particular virtual service operation.

As shown in FIG. 2, the team configuration for the team can also map virtual services 204 to particular endpoints 210. Endpoints 210 can correspond with different domain names, subdomains, hostnames, path components, or other URL elements associated with the virtual service proxy engine 106. In various examples, different endpoints 210 can be associated with different test environments, different training environments, draft or published versions of virtual services, and/or other types of environments or uses. Accordingly, service requests may invoke virtual service rules 208 for virtual service operations of a particular virtual service if the service requests are addressed to a domain name associated with the endpoint mapped to the virtual service.

The team can also re-map virtual services 204, and corresponding virtual service operations 206 and virtual service rules 208, to different endpoints 210, for instance via the user interface 120. Accordingly, the team can change the test environment or other type of endpoint associated with a virtual service without altering the virtual service rules 208 and other data associated with the virtual service. In some examples, the team can also map a virtual service to multiple endpoints 210 simultaneously.

In some examples, the team configuration for a team can include data in one or more tables of the virtual service database 104 that track virtual services 204, virtual service operations 206, virtual service rules 208, and/or endpoints 210 associated with team identifiers. For example, if the virtual service proxy engine 106 receives a service request that indicates team identifier 202 and is addressed to a particular URL associated with an endpoint, the virtual service proxy engine 106 can query the virtual service database 104 to determine if one or more virtual service rules 208 exist that correspond with a virtual service and/or a virtual service operation associated with the endpoint and/or the particular URL. If such virtual service rules 208 exist, the virtual service proxy engine 106 can then determine whether any of those virtual service rules 208 include match criteria that corresponds with other input parameters 114 of the service request. If so, the virtual service proxy engine 106 can select one of the virtual service rules, in some cases based on a priority order of the virtual service rules if match criteria of more than one of the virtual service rules corresponds with the input parameters 114 of the service request, and return a service response according to a team response defined by the selected virtual service rule.

In other examples, team identifiers can be associated with virtual service rules 208, and the virtual services 204, virtual service operations 206, and/or endpoints 210 associated with the virtual service rules 208 can be considered match criteria of the virtual service rules 208. For instance, in the example 100 shown in FIG. 1, the match criteria 126 of the virtual service rules 124 may indicate the virtual services 204, virtual service operations 206, and/or endpoints 210 associated with the virtual service rules 124, as well as other types of input parameters 114 that would satisfy the match criteria 126.

The virtual service database 104 can store multiple team configurations associated with multiple teams. The team configurations for different teams can be stored in association with different team identifiers. Each team can define separate virtual services 204, virtual service operations 206, and/or virtual service rules 208, in association with the team's team identifier. Even if teams define the same or similar virtual services 204, virtual service operations 206, and/or virtual service rules 208, the team configurations that define those virtual services 204, virtual service operations 206, and/or virtual service rules 208 can be associated with different team identifiers. Accordingly, the virtual service proxy engine 106 can use a team identifier indicated by a service request to retrieve information about the virtual services 204, virtual service operations 206, and/or virtual service rules 208 that are specifically associated with that team identifier in the virtual service database 104.

Users associated with teams can use the virtual service manager 102 to access data associated with team configurations, including virtual service rules and other data as shown in FIG. 2, in the virtual service database 104. In particular, users can use the user interface 120 of the virtual service manager 102 to view, create, and/or edit team configurations in the virtual service database 104, as discussed below with respect to FIG. 3.

Figure 3:
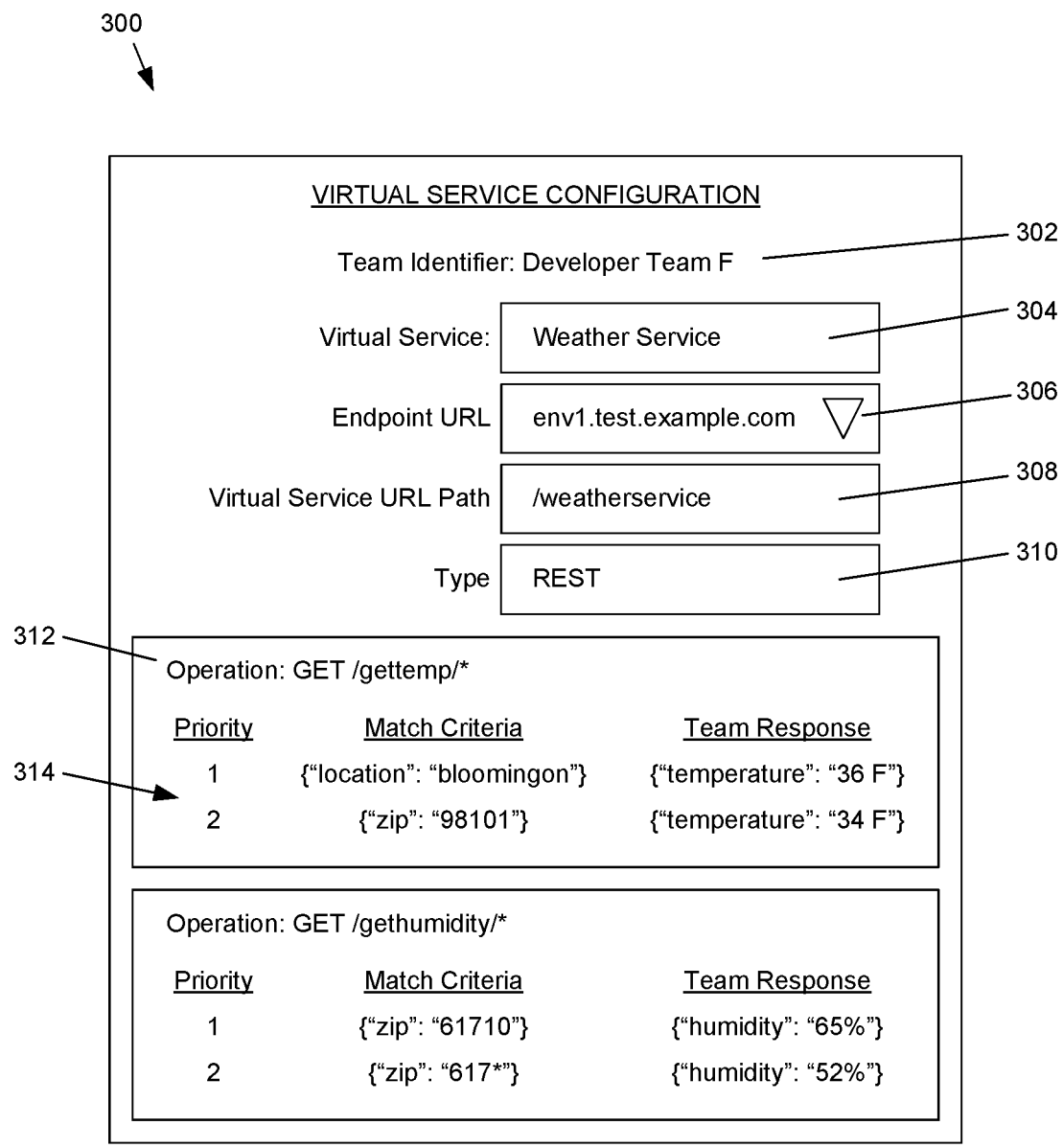
FIG. 3 shows an example of a user interface of a virtual service manager of the service virtualization platform.

FIG. 3 shows a non-limiting example 300 of the user interface 120 of the virtual service manager 102. Users associated with teams can log in to the virtual service manager 102 via the user interface 120, and can use the user interface 120 to view, create, and/or edit team configurations, including virtual service rules 124 associated with the teams, in the virtual service database 104. As an example, the user interface 120 can display selectable options, data entry fields, and/or other user interface elements by which a user can provide user input to define a new virtual service, virtual service operation, and/or virtual service rule. As another example, the user interface 120 can display information about an existing virtual service, virtual service operation, and/or virtual service rule stored in the virtual service database 104, and provide user interface elements a user can use to edit the existing data. The user interface 120 can be a graphical user interface, a text-based user interface, and/or any other type of user interface.

Users can have user accounts with the service virtualization platform. Users can accordingly log in to the virtual service manager 102 by providing usernames, passwords, and/or other types of login credentials associated with user accounts via the user interface 120. As described above, users can be associated with teams, and user accounts for such users can accordingly be associated with team identifiers 122 of the users' teams. When users log in to the virtual service manager 102 in association with their user accounts, the user interface 120 can allow the users to access and/or view team configurations or other information associated with their teams. For instance, in the example shown in FIG. 1, a user on a first team associated with team identifier 122A can log in to the virtual service manager 102 to view and/or edit information associated with virtual service rule 124A and virtual service rule 124B via the user interface 120. However, the user interface 120 may be configured to not display information to the user on the first team about other virtual service rules 124, such as virtual service rule 124C, that are associated with other teams.

In some examples, when a user logs in to the virtual service manager 102, the user interface 120 can display a team identifier 302 associated with the user's team, as shown in FIG. 3. As discussed above, the team identifier may be a port number associated with the team, or a name, number, or any other type of identifier associated with the team.

The user interface 120 can also allow a user to view and/or edit data associated with individual virtual services. For example, when a user on a team logs into the user interface 120, the user interface 120 may display a list of the virtual services currently associated with the user's team. The user may select one of the virtual services to view data associated with the selected virtual service, or select an option to create a new virtual service.

As shown in FIG. 3, the user interface 120 can display data associated with a particular virtual service, such as a name 304 of the virtual service, an endpoint URL 306 or other endpoint identifier associated with the virtual service, a virtual service URL path 308 associated with the virtual service, a service request type 310 associated with the virtual service, and/or other data. In some examples, a user can use the user interface 120 to edit information associated with the virtual service. For example, a user can use a dropdown menu, a text field, or other UI element to change the endpoint URL 306 associated with the virtual service. The user interface 120 can also have other screens or views that allow users to change the endpoint associated with one or more virtual services.

The information displayed in the user interface 120 for a particular virtual service can also include data associated with one or more operations 312 of the particular virtual service. For instance, data associated with two operations 312 are shown in the example of FIG. 3, including a "get temperature" operation and a "get humidity" operation. In this example, the virtual service URL path 308 can be "/weatherservice," and the "get temperature" operation can be associated with a further URL path element of "/gettemp/*" (where "*" designates a wildcard that can be satisfied by any value, or no value). Accordingly, service requests addressed to the virtual service proxy engine 106 using a URL path of "/weatherservice/gettemp/," with or without any additional portions of the URL path following "/gettemp/," can be processed according to the "get temperature" operation shown in FIG. 3 if the service requests indicate the team identifier 302.

The user interface 120 can display data for each of the operations 312, including data associated with specific virtual service rules 314 associated with the operations. For example, FIG. 3 shows data for two virtual service rules 314 associated with the "get temperature" operation, including a priority order of the virtual service rules 314, match criteria of the virtual service rules, and team responses of the virtual service rules. In some examples, as discussed above, the virtual service, virtual service operation, endpoint, and/or other data associated with a virtual service rule can be considered to be additional match criteria of the virtual service rule.

The user interface 120 can allow a user to select any of the displayed virtual service rules 124 to edit its match criteria and/or team response, for instance via text input. The user interface 120 can also allow the user to adjust the priority order of the virtual service rules 124 associated with a virtual service operation, for instance by editing the priority values associated with the virtual service rules 124 or by dragging and dropping the virtual service rules 124 to re-order the virtual service rules 124. The user interface 120 can additionally allow a user to create new virtual service rules 124, create new virtual service operations, create new virtual services, and/or edit any other data associated with the team configuration of the user's team.

As discussed above, a team can define multiple virtual service rules 124 associated with the same virtual service and virtual service operation via the user interface 120. Such virtual service rules 124 can be stored in the virtual service database 104 in association with the team identifier 302 of the user's team. If another user associated with a different team logs into the user interface 120 and enters the user input to define virtual service rules 124 with the same match criteria, that user input can create distinct virtual service rules 124 in the virtual service database 104 that are associated with a different tears identifier. Accordingly, by being associated with different team identifiers 122, virtual service rules 124 for different teams can avoid conflicting with one another, even if the virtual service rules 124 are associated with the same test environment or other endpoint, the same URL path, and/or other shared match criteria 126.

The virtual service rules 124 defined by one or more teams via the user interface 120 can be stored in the virtual service database 104. The virtual service rules 124 stored in the virtual service database 104 can be accessible by the virtual service proxy engine 106, such that the virtual service proxy engine 106 can respond to service requests based on the virtual service rules 124 as described further below with respect to FIG. 4.

Figure 4:
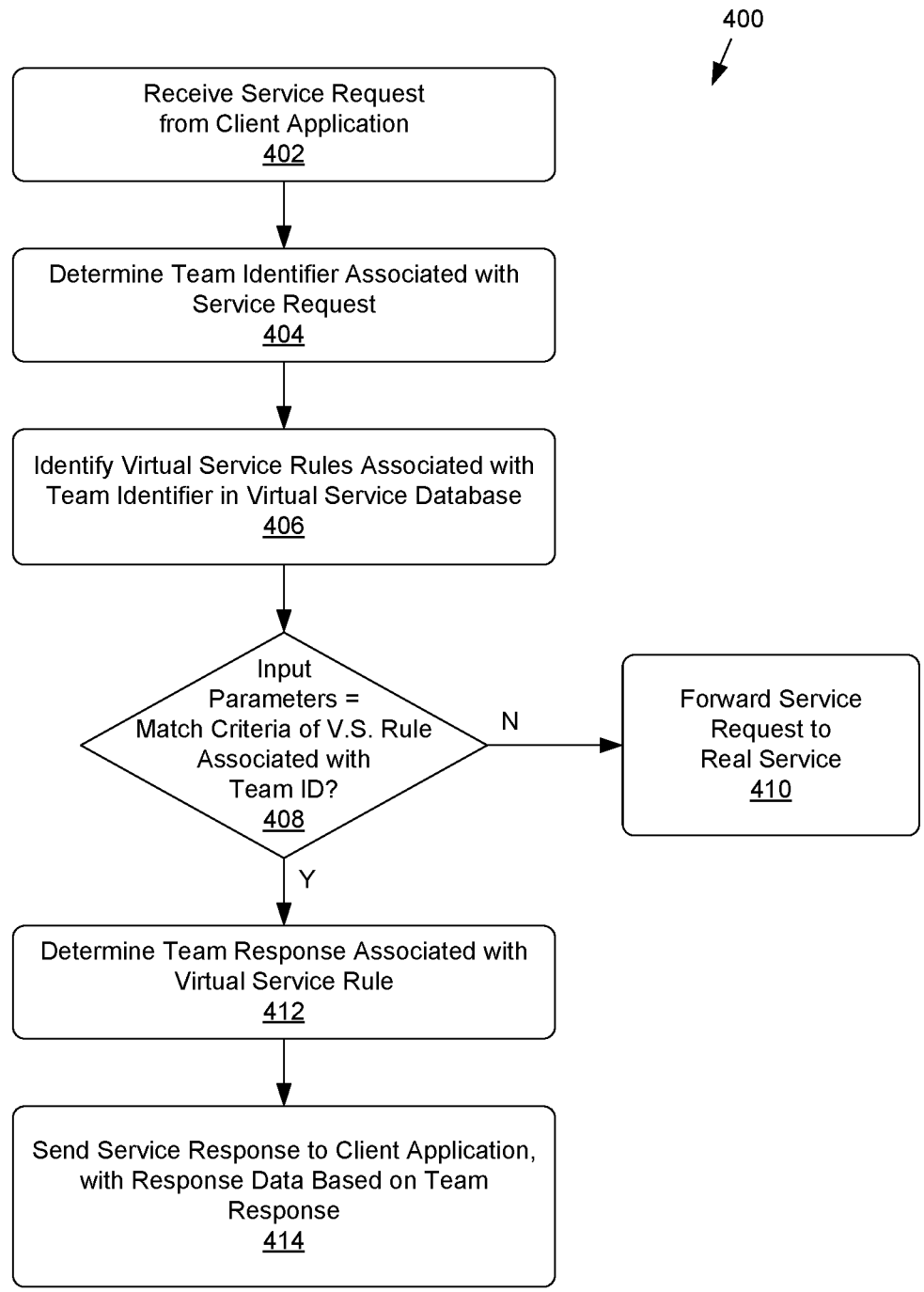
FIG. 4 shows a flowchart of an example process for implementing virtual services via the service virtualization platform.

FIG. 4 shows a flowchart of an example process 400 for implementing virtual services via the service virtualization platform described herein. Process 400 may be implemented using one or more computing devices. An example system architecture for such a computing device is described below with respect to FIG. 5.

At block 402, the virtual service proxy engine 106 can receive the service request 112 from the client application 108. The service request 112 can be a REST request, a SOAP request, or any other type of request associated with a service. The virtual service proxy engine 106 can determine a team identifier associated with the received service request 112 at block 404.

In some examples, the virtual service proxy engine 106 can expose different ports for different teams, and accordingly the team identifiers for different teams can be the port numbers associated with the teams by the virtual service proxy engine 106. In these examples, a team can configure the client application 108 to address the service request 112 to the virtual service proxy engine 106 in part based on the port associated with the team. The virtual service proxy engine 106 can thus determine the team identifier associated with the service request 112 based on the port through which the virtual service proxy engine 106 receives the service request 112.

In other examples, the team identifier associated with the service request 112 can be a name, number, or other value associated with a team. In these examples, a team can configure the client application 108 to generate the service request 112 with the team identifier of the team encoded into a header value of the service request 112, into the body of the service request 112, and/or into any other data associated with the service request 112. The virtual service proxy engine 106 can thus identify the team identifier in data associated with the service request 112.

At block 406, the virtual service proxy engine 106 can identify one or more virtual service rules 124 that are associated, in the virtual service database 104, with the team identifier determined at block 404. For example, if the team identifier determined at block 404 is the team identifier 122A shown in FIG. 1, the virtual service proxy engine 106 can determine at block 406 that virtual service rule 124A and virtual service rule 124B are associated with team identifier 122A in the virtual service database 104. At block 408, the virtual service proxy engine 106 can determine if input parameters 114 of the service request 112 correspond with match criteria 126 of any of the virtual service rules 124 identified at block 406 that are associated with the team identifier of the service request 112.

In some examples, the virtual service proxy engine 106 can use a URL, to which the service request 112 is addressed, to identify virtual service rules 124 that correspond to the service request 112 at block 404 and/or block 406. For example, a domain of the URL may indicate a test environment or other type of endpoint, while a path of the URL may identify a particular virtual service and/or virtual service operation. The virtual service proxy engine 106 can accordingly attempt to identify virtual service rules 124, in the virtual service database 104, that are associated with the team identifier determined at block 404, and that are also associated with the endpoint, virtual service, and virtual service operation indicated by the URL to which the service request 112 is addressed.

The virtual service proxy engine 106 can also determine, at block 406, whether other input parameters 114 of the service request 112 satisfy other match criteria 126 of at least one of the identified virtual service rules 124. For example, the input parameters 114 of the service request may indicate values for one or more attributes, and the virtual service proxy engine 106 can determine whether the values for those attributes satisfy match criteria 126 of at least one of the identified virtual service rules. In some examples, the virtual service database 104 can indicate a priority order of multiple virtual service rules 124, such that the virtual service proxy engine 106 can evaluate the input parameters 114 of the service request 112 against the match criteria 126 of the identified virtual service rules in the priority order.

If the virtual service proxy engine 106 determines that the input parameters 114 of the service request 112 do not correspond with match criteria 126 of any of the virtual service rules 124 associated with the team identifier (Block 408—No), at block 410 the virtual service proxy engine 106 can forward the service request 112 to a real service, such as the real service 110 shown in FIG. 1. For example, if the service request 112 is a request to a weather service to retrieve a temperature for a particular zip code, but the zip code indicated in the service request 112 does not correspond with match criteria 126 of any virtual service rules 124 defined by the team associated with the service request 112, the virtual service proxy engine 106 can forward the service request 112 to a real weather service. The virtual service proxy engine 106 can also receive a response from the real service, and forward the response from the real service to the client application 108. As another example, if the virtual service proxy engine 106 determines that the endpoint, virtual service, or virtual service operation indicated by the service request 112 is currently toggled off in association with the team identifier determined at block 402, or that one or more virtual service rules that otherwise would have matched the input parameters 114 of the service request 112 is currently toggled off, the virtual service proxy engine 106 can forward the service request 112 to a real service at block 410.

However, if the virtual service proxy engine 106 determines that the input parameters 114 of the service request 112 does correspond with match criteria 126 of one of the virtual service rules 124 associated with the team identifier (Block 408—Yes), at block 412 the virtual service proxy engine 106 can determine the team response associated with that virtual service rule in the virtual service database 104. For example, if the input parameters 114 correspond with the match criteria 126B of virtual service rule 124B shown in FIG. 1, the virtual service proxy engine 106 can retrieve the team response 128B associated with virtual service rule 124B in the virtual service database 104.

At block 414, the virtual service proxy engine 106 can generate and send the service response 116 to the client application, in response to the service request 112. The virtual service proxy engine 106 can include response data 118 in the service response 116 that is based on the team response determined at block 412.

Accordingly, if a first team configures the client application 108 to send a service request associated with a team identifier of the first team, the virtual service proxy engine 106 can use process 400 to identify a candidate set of virtual service rules 124 in the virtual service database 104 that is associated with the team identifier of the first team. The virtual service proxy engine 106 can also identify a particular virtual service rule, in the candidate set of virtual service rules 124 associated with the team identifier of the first team, that has match criteria 126 that corresponds with input parameters 114 of the service request. The virtual service proxy engine 106 can accordingly return a service response that includes a team response defined by that particular virtual service rule.

However, if a second team configures the client application 108, or a different client application, to send a similar service request associated with a different team identifier of the second team, the virtual service proxy engine 106 can use process 400 to identify a second candidate set of virtual service rules 124 in the virtual service database 104 that is associated with the team identifier of the second team, and return a service response based on a team response defined by a matching virtual service rule of the second candidate set of virtual service rules 124. As such, even if the service request associated with the second team's team identifier has the same input parameters as the service request associated with the first team's team identifier, the virtual service proxy engine 106 can use the different team identifiers of the different service requests to identify different candidate sets of virtual service rules, and respond to the same input parameters based on different team responses 128 defined in the different candidate sets of virtual service rules.

Accordingly, by associating virtual service rules 124 with team identifiers 122 of different teams, the service virtualization platform 100 can avoid conflicts between service requests associated with different teams. Avoiding such conflicts can reduce network bandwidth usage, processor usage, memory usage, and/or usage of other computing resources. Avoiding such conflicts can also avoid delays in software development or production schedules, and avoid troubleshooting time and effort spent to locate and resolve issues that might otherwise cause conflicts between service requests associated with different teams.

For example, if virtual services were not associated with team identifiers as described herein, a first team's configuration of a virtual service to return data, different than data expected by a second team, may cause disruption and/or failure of software development tests associated with the second team. Failure of the second team's tests, due to a conflicting configuration of the virtual service by the first team, can cause processor cycles, memory, and bandwidth usage associated with executing the second team's tests to be wasted. The second team may respond to the failed tests by reconfiguring the virtual service to return the data expected by the second team, and by re-executing the second team's tests, which can use additional processor cycles, memory, bandwidth, and/or other computing resources. However, because the service virtualization platform 100 described herein can associate different teams with different virtual service rules 124, any changes to a virtual service rule made by a first team would not impact tests associated with a different virtual service rule associated with a second team, and the second team's tests can be executed as expected without team conflicts that may prolong development times, waste computing resources, and/or lead to increased usage of computing resources.

Figure 5:
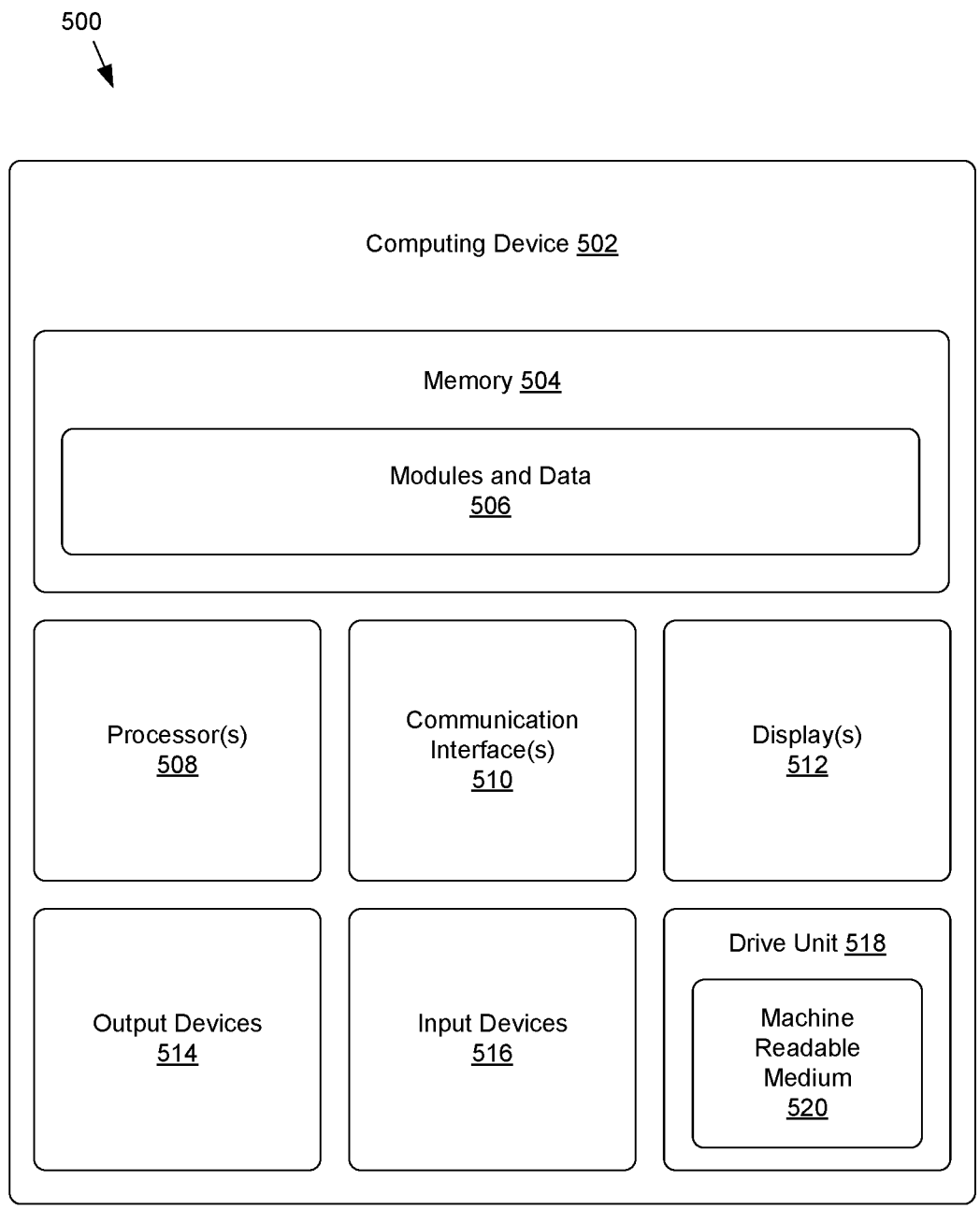
FIG. 5 shows an example system architecture for a computing device associated with the service virtualization platform.

FIG. 5 shows an example system architecture 500 for a computing device 502 associated with the service virtualization platform described herein. The computing device 502 can be a server, computer, or other type of computing device that executes, and/or stores data associated with, one or more portions of the service virtualization platform. In some examples, elements of the service virtualization platform can be distributed among, and/or be executed by, multiple computing devices. As a non-limiting example, a first computing device can execute the virtual service manager 102, a second computing device can store and/or manage the virtual service database 104, and a third computing device can execute the virtual service proxy engine 106. As another non-limiting example, the virtual service database 104 can be stored on a computing device that also executes the virtual service manager 102 and/or the virtual service proxy engine 106.

The computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 502. Any such non-transitory computer-readable media may be part of the computing device 502.

The memory 504 can store modules and data 506. The modules and data 506 can include data associated with the virtual service manager 102, the virtual service database 104, the virtual service proxy engine 106, and/or other data. The modules and data 506 can also include any other modules and/or data that can be utilized by the computing device 502 to perform or enable performing any other actions. Such other modules and data can include a platform, operating system, and applications, and data utilized by the platform, operating system, and applications.

The computing device 502 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with volatile (RAM) and/or non-volatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen, and can then also act as an input device or keypad, such as for providing a soft-key keyboard, navigation buttons, or any other type of input.

The output devices 514 can include any sort of output devices known in the art, such as the display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions, such as software or firmware, that embodies any one or more of the methodologies or functions described herein. The instructions can also reside, completely or at least partially, within the memory 504, processor(s) 508, and/or communication interface(s) 510 during execution thereof by the computing device 502. The memory 504 and the processor(s) 508 also can constitute machine readable media 520.

Overall, by storing different virtual service rules 124 in the virtual service database 104 that are associated with different team identifiers 122, the service virtualization platform described herein can distinguish between service requests that are associated with different teams. Accordingly, if a first team configures a software application to request data from a virtual service based on indicated input parameters, the service virtualization platform can use a virtual service rule associated with the first team to provide a team response configured by the first team in response to the request. As such, even if one or more other teams have defined similar virtual service rules for the same input parameters that may indicate different team responses 128, the service virtualization platform can avoid conflicts between the teams by responding to the service request associated with the first team based on a virtual service rule that is specifically associated with the first team.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   maintaining, by a virtual service proxy engine executed by one or more processors, a plurality of virtual service rules that correspond to a virtual service executed by the virtual service proxy engine, wherein:
   different sets of rules, included in the plurality of virtual service rules, respectively correspond with team identifiers of different teams, and
   the team identifiers of the different teams comprise port numbers of respective different ports exposed by the virtual service proxy engine;
   receiving, by the virtual service proxy engine, a service request from a client application configured to use a team identifier, of a particular team, that comprises a particular port number of a particular port exposed by the virtual service proxy engine, wherein the service request indicates:
   the team identifier, and
   at least one input parameter associated with the virtual service;
   identifying, by the virtual service proxy engine, a virtual service rule, of the plurality of virtual service rules, that is associated with:
   the team identifier, and
   match criteria that corresponds with the at least one input parameter;
   determining, by the virtual service proxy engine, a team response indicated by the virtual service rule;
   generating, by the virtual service proxy engine, a service response based on the team response; and
   sending, by the virtual service proxy engine, the service response to the client application in response to the service request.

2. The computer-implemented method of claim 1, further comprising:
   identifying, by the virtual service proxy engine, a particular set of rules that corresponds to the team identifier; and
   identifying, by the virtual service proxy engine, the virtual service rule from among the particular set of rules based on a determination that the at least one input parameter corresponds with the match criteria of the virtual service rule.

3. The computer-implemented method of claim 2, wherein:
   the particular set of rules is associated with a priority order, and
   identifying the virtual service rule comprises identifying, based on the priority order, a highest-priority virtual service rule in the particular set of rules that corresponds with the at least one input parameter.

4. The computer-implemented method of claim 2, wherein:
   a uniform resource locator (URL) path, to which the service request is addressed, corresponds to particular virtual service operation of the virtual service,
   the particular set of rules is associated with one or more virtual service operations, and
   identifying the virtual service rule comprises identifying a particular virtual service rule in the particular set of rules that corresponds with the particular virtual service operation indicated by the URL path.

5. The computer-implemented method of claim 1, wherein the service request is a first service request, the team identifier is a first team identifier, the particular port number is a first port number, the team response is a first team response, and the method further comprises:
   receiving, by the virtual service proxy engine, a second service request from a second client application configured to use a second team identifier, of a second team, that comprises a second port number of a second port exposed by the virtual service proxy engine, wherein the second service request indicates:
   the second team identifier, and
   the at least one input parameter;
   identifying, by the virtual service proxy engine, a second virtual service rule that is associated with:
   the second team identifier, and
   second match criteria that corresponds with the at least one input parameter;
   determining, by the virtual service proxy engine, a second team response indicated by the second virtual service rule, wherein the second team response is different from the first team response;
   generating, by the virtual service proxy engine, a second service response based on the second team response; and sending, by the virtual service proxy engine, the second service response to the second client application in response to the second service request.

6. The computer-implemented method of claim 1, further comprising:
receiving, by the virtual service proxy engine, and via a virtual service manager, user input associated with the virtual service rule; and
adjusting, by the virtual service proxy engine, and one or more of the match criteria or the team response associated with the virtual service rule based on the user input.

7. The computer-implemented method of claim 1, further comprising:
receiving, by the virtual service proxy engine, a second service request from the client application, wherein the second service request indicates the team identifier and at least one second input parameter;
determining, by the virtual service proxy engine, that the at least one second input parameter is not associated with any virtual service rules associated with the team identifier;
forwarding, by the virtual service proxy engine, the second service request to a real service that corresponds with the virtual service; and
forwarding, by the virtual service proxy engine, and to the client application, a response from the real service to the second service request.

8. The computer-implemented method of claim 1, wherein the virtual service proxy engine receives the service request via the particular port that corresponds to the particular port number.

9. The computer-implemented method of claim 1, wherein the service request is at least one of a Representational State Transfer (REST) request, a Hypertext Transfer Protocol (HTTP) request, or a Simple Object Access Protocol (SOAP) message sent by the client application to the virtual service proxy engine via a network.

10. The computer-implemented method of claim 6, wherein a user interface of the virtual service manager is configured to:
display attributes of the virtual service rule, and
receive the user input via user interface elements of the user interface.

11. A service virtualization platform, comprising:
a virtual service database configured to store team configurations comprising a plurality of virtual service rules, wherein;
different sets of rules, included in the plurality of virtual service rules, respectively correspond with team identifiers of different teams, and
individual virtual service rules are associated with match criteria and team responses; and
a virtual service proxy engine configured to:
execute a virtual service;
expose different ports, wherein the team identifiers comprise different port numbers of the different ports;
receive, from client applications, service requests corresponding to the virtual service, wherein the service requests indicate;
the team identifiers that the client applications are respectively configured to use, and
input parameters associated with the virtual service;
identify, based on the service requests, corresponding virtual service rules in the virtual service database that are associated with:
the team identifiers indicated by the service requests, and
match criteria corresponding with the input parameters of the service requests;
generate, based on the team responses of the corresponding virtual service rules, service responses to the service requests; and
send the service responses to the client applications, in response to the service requests.

12. The service virtualization platform of claim 11, further comprising a virtual service manager configured to:
accept, via a user interface, user input that defines a virtual service rule associated with a team identifier; and
cause the virtual service rule to be stored in the virtual service database.

13. The service virtualization platform of claim 11, wherein the virtual service database stores:
a first virtual service rule associated with a first team identifier, the first virtual service rule indicating first match criteria and a first team response, and
a second virtual service rule associated with a second team identifier, the second virtual service rule indicating the first match criteria and a second team response that is different from the first team response.

14. The service virtualization platform of claim 13, wherein the virtual service proxy engine is configured to respond to a service request, indicating the second team identifier and an input parameter corresponding with the first match criteria, based on the second virtual service rule.

15. The service virtualization platform of claim 11, wherein the virtual service proxy engine is configured to identify, in response to a particular service request that identifies a particular team identifier of a particular team, and from the virtual service database, a particular set of rules, of the plurality of virtual service rules, that correspond to the particular team identifier.

16. The service virtualization platform of claim 15, wherein the virtual service proxy engine is configured to:
identify a particular virtual service rule, in the particular set of rules, based on at least one of:
a priority order of the particular set of rules, or
a virtual service operation, of the virtual service, identified by the particular service request, and
generate a particular service response, corresponding to the particular service request, based on the particular virtual service rule.

17. One or more non-transitory computer-readable media storing computer-executable instructions associated with a virtual service proxy engine that, when executed by one or more processors, cause the one or more processors to perform operations comprising:
maintaining a plurality of virtual service rules that correspond to a virtual service executed by the virtual service proxy engine, wherein:
different sets of rules, included in the plurality of virtual service rules, respectively correspond with team identifiers of different teams, and
the team identifiers of the different teams comprise port numbers of respective different ports exposed by the virtual service proxy engine;
receiving a service request from a client application configured to use a team identifier, of a particular team, that comprises a particular port number of a particular port exposed by the virtual service proxy engine, wherein the service request indicates:
the team identifier, and at least one input parameter associated with the virtual service;

identifying a particular set of rules, from among the plurality of virtual service rules, that is associated with the team identifier;

identifying, among the particular set of rules, a particular virtual service rule associated with match criteria that corresponds with the at least one input parameter;

determining a team response indicated by the particular virtual service rule; and sending, in response to the service request, a service response to the client application based on the team response.

18. The one or more non-transitory computer-readable media of claim 17, wherein the service request is a first service request, the team identifier is a first team identifier, the particular port number is a first port number, the team response is a first team response, and the operations further comprise:

receiving a second service request from a second client application configured to use a second team identifier, of a second team, that comprises a second port number of a second port exposed by the virtual service proxy engine, wherein the second service request indicates:
the second team identifier, and
the at least one input parameter;

identifying a second set of rules, of the plurality of virtual service rules, associated with the second team identifier;

identifying, among the second set of rules, a particular second virtual service rule associated with second match criteria that corresponds with the at least one input parameter;

determining a second team response indicated by the particular second virtual service rule, wherein the second team response is different from the first team response; and sending, in response to the second service request, a second service response to the second client application based on the second team response.

19. The one or more non-transitory computer-readable media of claim 17, wherein the operations further comprise:

receiving a second service request from the client application, wherein the second service request indicates the team identifier and at least one second input parameter;

determining that the at least one second input parameter is not associated with any virtual service rules associated with the team identifier;

forwarding the second service request to a real service that corresponds with the virtual service; and forwarding, to the client application a response from the real service to the second service request.

20. The one or more non-transitory computer-readable media of claim 17, wherein the operations further comprise identifying the particular virtual service rule based on at least one of:

a priority order of the particular set of rules, or a virtual service operation, of the virtual service, identified by the service request.

* * * * *